US006769832B2

(12) United States Patent
Bedi

(10) Patent No.: US 6,769,832 B2
(45) Date of Patent: Aug. 3, 2004

(54) CLOCK LOCK

(76) Inventor: Daljit S. Bedi, 4616 Wainscot Rd., Mississauga, Ont (CA), L5V-1E9

( * ) Notice: Subject to any disclaimer, the term of this patent is extended or adjusted under 35 U.S.C. 154(b) by 0 days.

(21) Appl. No.: 09/854,376

(22) Filed: May 15, 2001

(65) Prior Publication Data

US 2002/0172552 A1 Nov. 21, 2002

(51) Int. Cl.⁷ ................................................. F16B 7/04
(52) U.S. Cl. ...................... 403/352; 403/350; 403/351; 403/353; 403/326; 403/327; 24/DIG. 53
(58) Field of Search ................................ 403/350–353, 403/345, 326–328, 330; 411/552, 553, 549, 554, 555, 348, 349, 388, 389; 70/358, 491–193; 292/120, 106, 218, 207, 56; 24/287, 288, DIG. 53–55; 410/82

(56) References Cited

U.S. PATENT DOCUMENTS

| | | | | |
|---|---|---|---|---|
| 4,296,689 A | * | 10/1981 | Hardesty | 102/260 |
| 4,753,091 A | * | 6/1988 | Sheets | 70/364 |
| 4,782,561 A | * | 11/1988 | Hayama | 24/287 |
| 5,356,249 A | * | 10/1994 | Hove | 410/83 |
| 5,803,648 A | * | 9/1998 | Foy | 403/325 |
| 5,855,449 A | * | 1/1999 | Thomas | 403/262 |
| 5,855,451 A | * | 1/1999 | Milton et al. | 403/348 |
| 5,893,284 A | * | 4/1999 | Hrabal | 70/358 |
| 5,893,692 A | * | 4/1999 | Asanuma | 11/97 |
| 6,113,305 A | * | 9/2000 | Takaguchi | 403/321 |
| 6,164,862 A | * | 12/2000 | Takaguchi | 403/325 |

FOREIGN PATENT DOCUMENTS

DE              32 07 420     *  8/1983     ............. F16B/2/18

* cited by examiner

*Primary Examiner*—Lynne H. Browne
*Assistant Examiner*—Michael P. Ferguson
(74) *Attorney, Agent, or Firm*—Young & Thompson

(57) ABSTRACT

A system for joining two rails includes a rotatable disc in a slot in an end of a rail, where the disc has a pair of diametrically opposed notches, a pair of diametrically opposed first sectors having a first radius, and a pair of diametrically opposed second sectors having a second radius larger than the first radius. A movable stopper in the rail is urged into the slot at a position where the stopper engages one of the first sectors when a pin in the rail engages one of the notches, and one of the second sectors is between the one first sector and the notch engaging the pin.

12 Claims, 9 Drawing Sheets

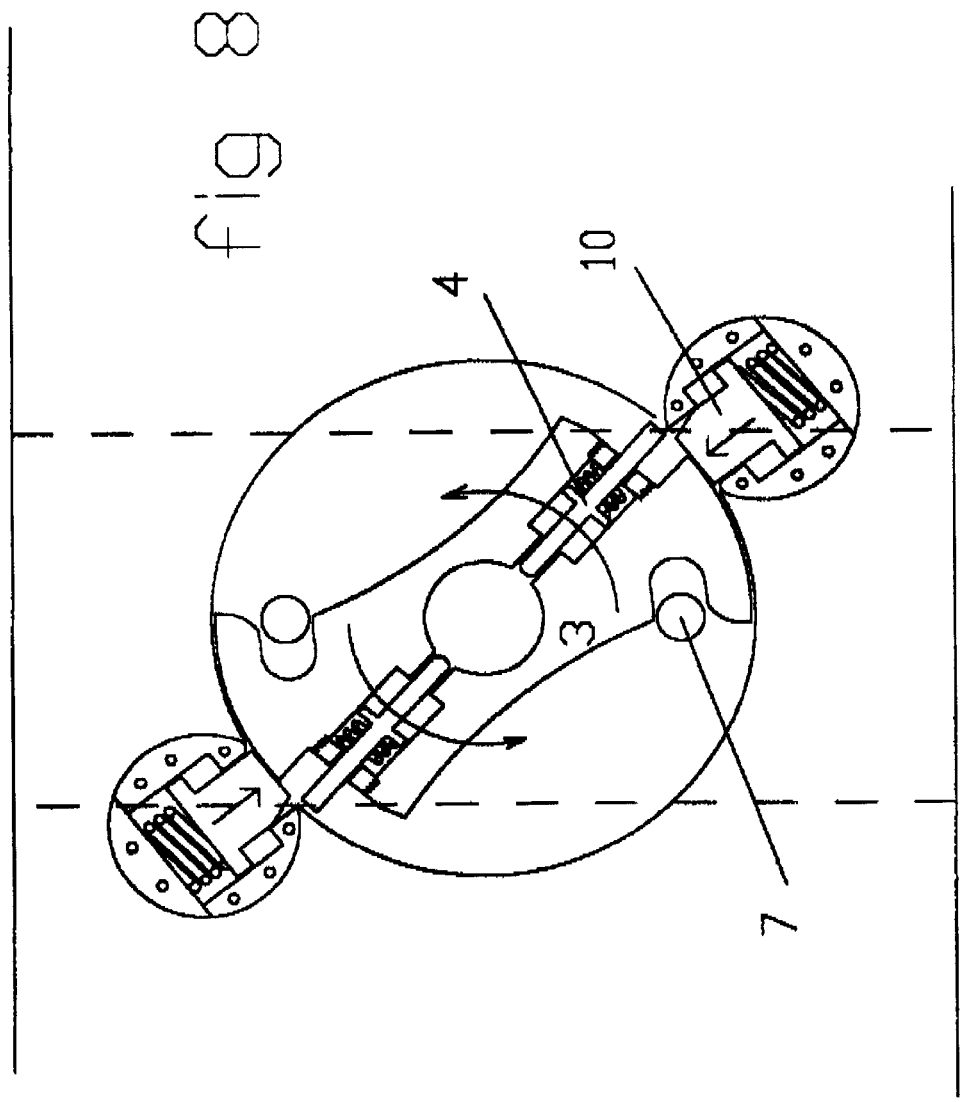

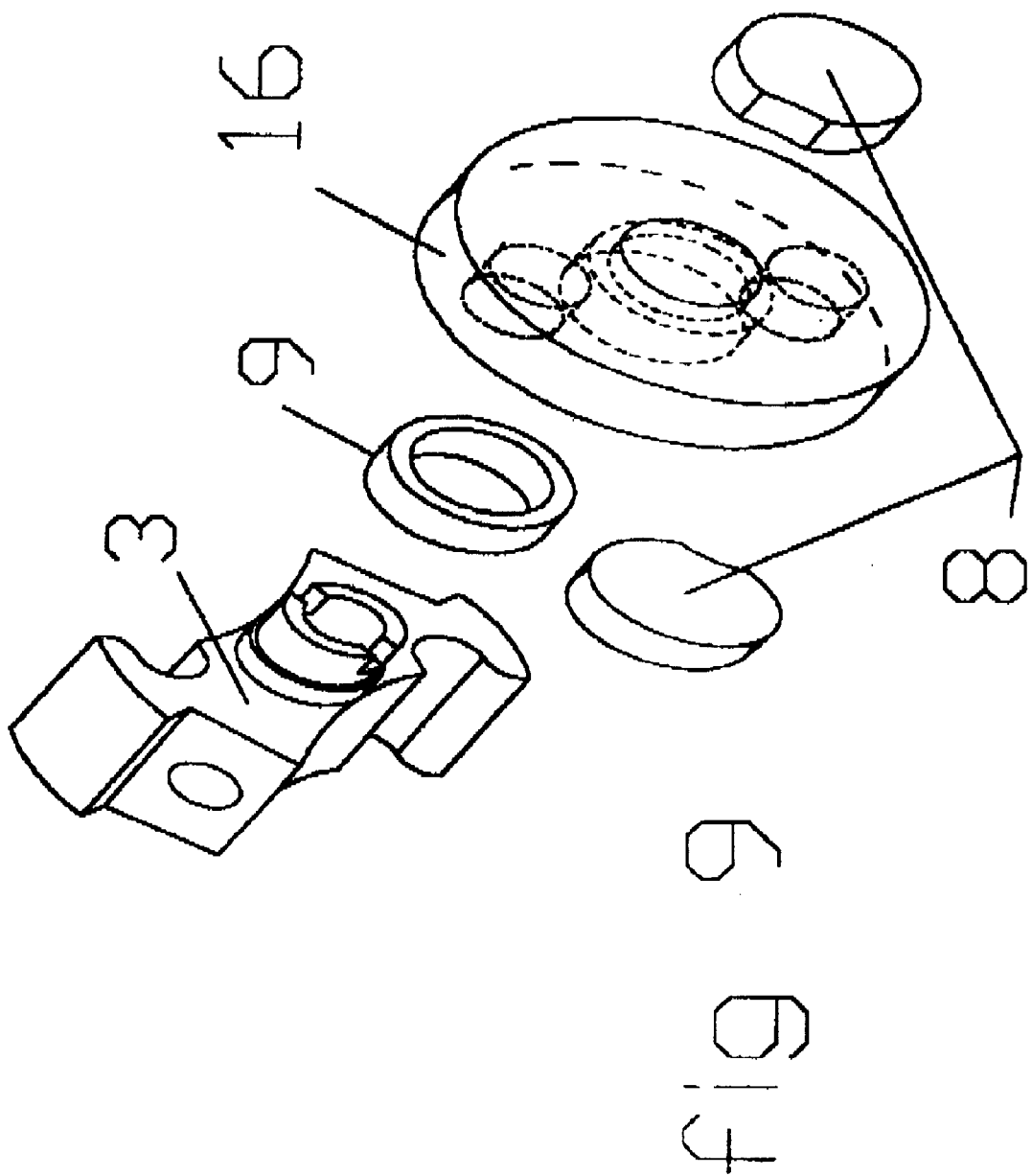

CLOCK LOCK

BACKGROUND OF THE INVENTION

Field of the Invention

This invention relates to a coupling device that is easy to assemble, and just as easy to disassemble. This internal connecter device is shown here, as an example in the form of a rail. However it is not exclusively concerned with the formation of a rail. The "clock lock" can also be turned into the formation of a "T"-JUNCTION. Although its basic principles of operation do not change. With this method of assembly it is possible to achieve very flat external surfaces, at the point of connection, between two separate rails.

SUMMARY OF THE INVENTION

A system for joining two rails includes a rotatable disc in a slot in an end of a rail, where the disc has a pair of diametrically opposed notches, a pair of diametrically opposed first sectors having a first radius, and a pair of diametrically opposed second sectors having a second radius larger than the first radius. A movable stopper in the rail is urged into the slot at a position where the stopper engages one of the first sectors when a pin in the rail engages one of the notches, and one of the second sectors is between the one first sector and the notch engaging the pin.

BRIEF DESCRIPTION OF THE DRAWINGS

An embodiment of the present invention will now be described, by way of example, with reference to the accompanying drawings, in which:

FIG. 8 shows the "T" junction, at the unlocking stage; and

FIG. 9 shows an exploded view of the central piece, bearing, and guide plate, which are pressed into each other and act as one unit.

| LEGEND | |
|---|---|
| (A) | RAIL |
| (B) | RAIL |
| (3) | Central locking piece |
| (4) | Pin |
| (5) | Spring |
| (6) | Threaded nut |
| (7) | Rivet or pin |
| (8) | Threaded cap |
| (9) | Bearing (prior art) |
| (10) | Slider |
| (11) | Spring |
| (12) | Wedge |
| (14) | Screw driver (prior art). With wedge to unlock Without wedge to lock |
| (15) | Pin |
| (16) | Cover |
| (17) | Guide pins or guide section |

DESCRIPTION OF THE PREFERRED EMBODIMENT

Figure 1:
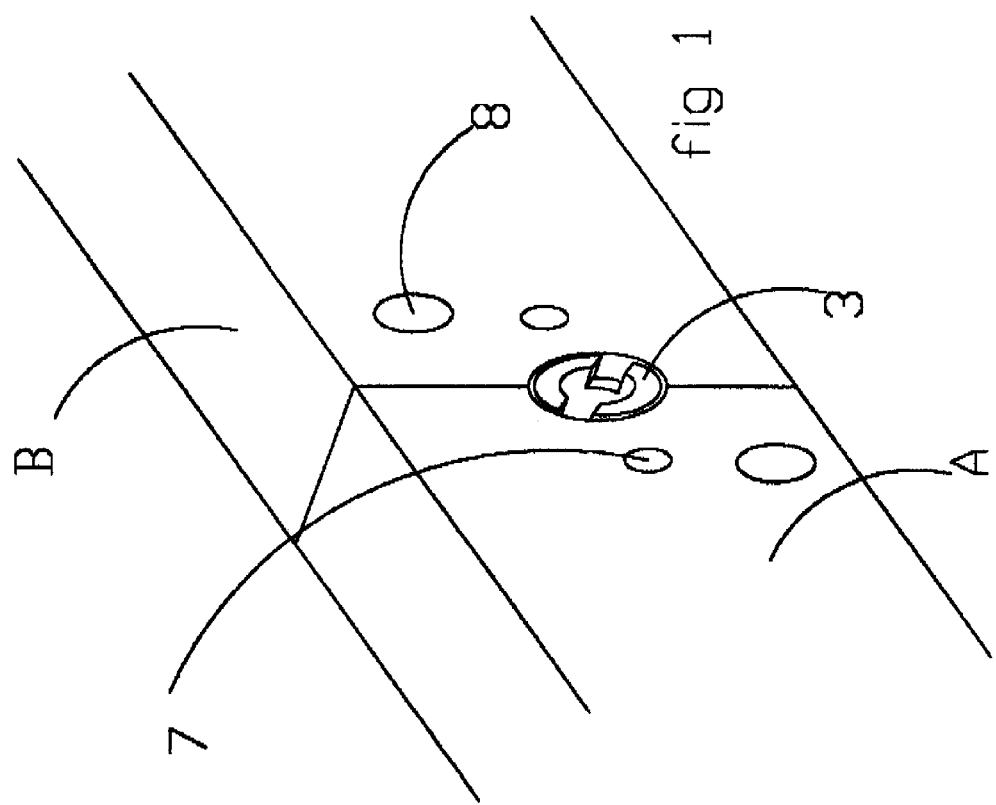
FIG. 1 is an assembled view of the two rails at the joint.

THE "CLOCK LOCK" is a coupling device, between two identical rails, to form an extension, and a "T" junction, such as shown in FIG. 1. However the external rectangular shape can be varied. This offers a very flat surface on all sides at the joint, with minimum obstructions.

Figure 5:
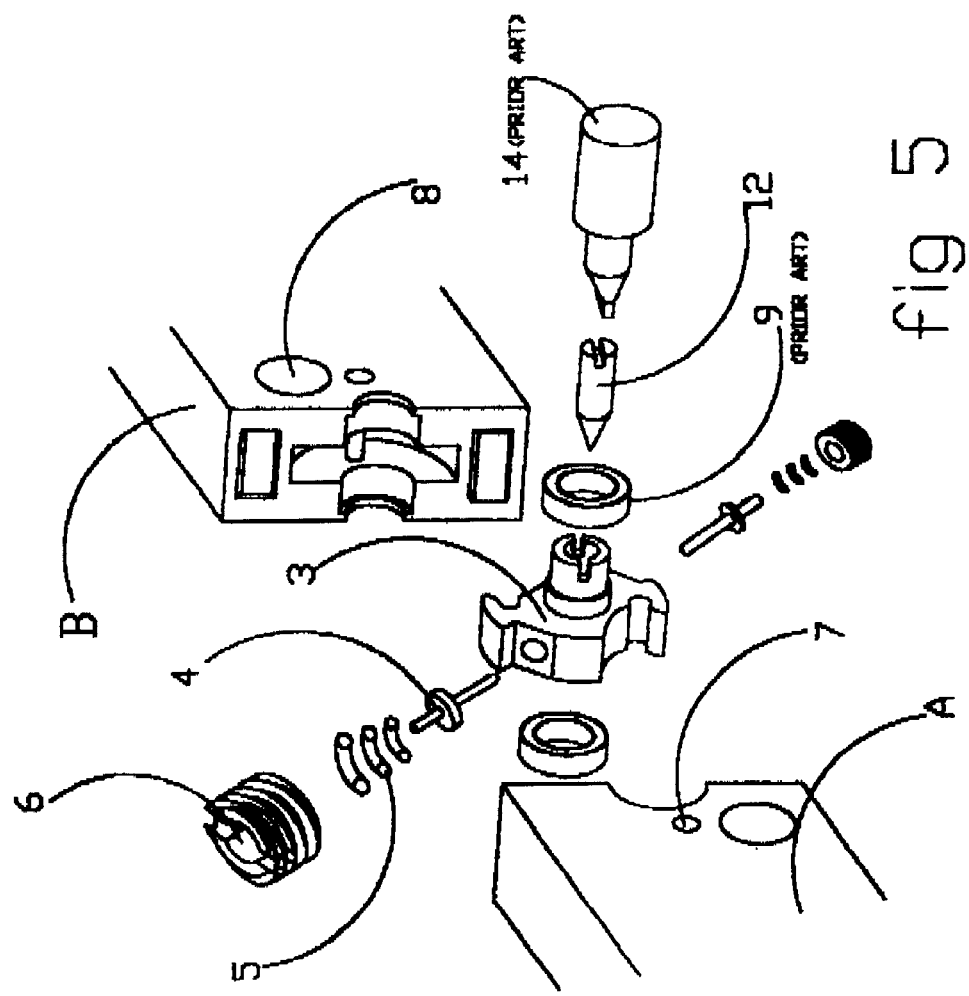
FIG. 5 is a partially exploded view of the central piece with the rails in line with each other.
Figure 6:
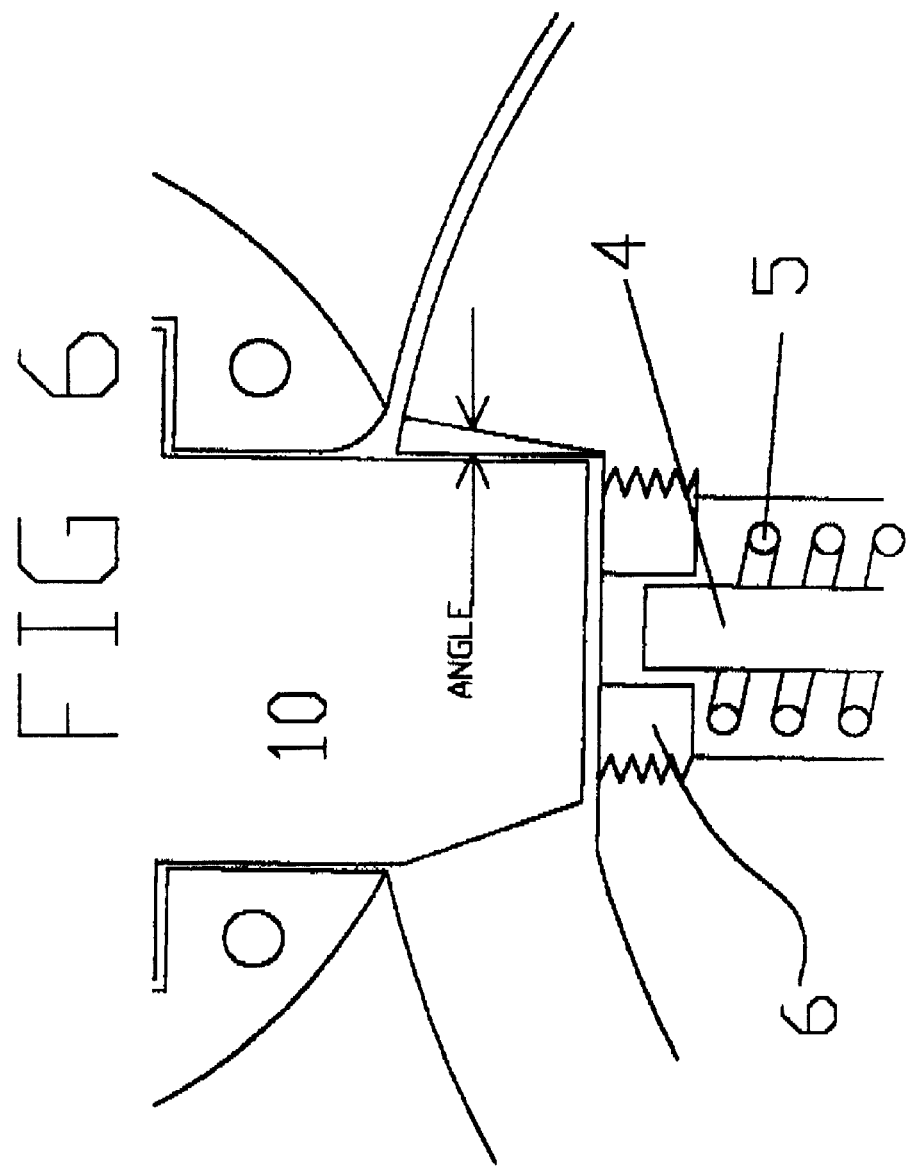
FIG. 6 shows the angle at which the central piece is machined to allow the spring-loaded slider to engage in the locked position.

The connector between the rails is within the rail ends, as are the remainder of the working parts that make up the "CLOCK LOCK". Each end face of the rail has in its molded state two regions (17) such as shown in FIG. 5. One is a protrusion, and one an intrusion, as the two faces of the rails are brought together they interlock, and this prevents any twisting motion, at the joint. Another way may be the use of pins. A hole is drilled, and is counter-sunk, on both sides of the rail. Regions are machined in the face of the rail, to provide capacity for the central piece (3) to rotate into the locked position. Regions are machined to accommodate the bearings (9) to seat in their proper locations. Another region is machined and a lip is formed on the outside, this further assists the bearings to seat in their proper location. On one side another region is machined to accommodate the calibrated spring-loaded slider (10) and housing (10, 11, 12, 8). This housing is secured to the rail by either screws or with pins. This acts as a lock to prevent the central piece from rotating freely. A cover (8) is threaded and is tightened to the housing sections, and this also acts as an integral part of the housing for the slider. A rod (7) is inserted through the hole, and is either welded or forged on both sides of the rail and is finished flush to the rail. This rod is what the central piece (3) hooks on to. This describes one end of the rail; the opposite end of the rail is finished in the same manner, keeping in mind that the spring-loaded slider regions are machined on one side of the rail only. However it is possible to machine this region from either side of the rail.

Figure 2:
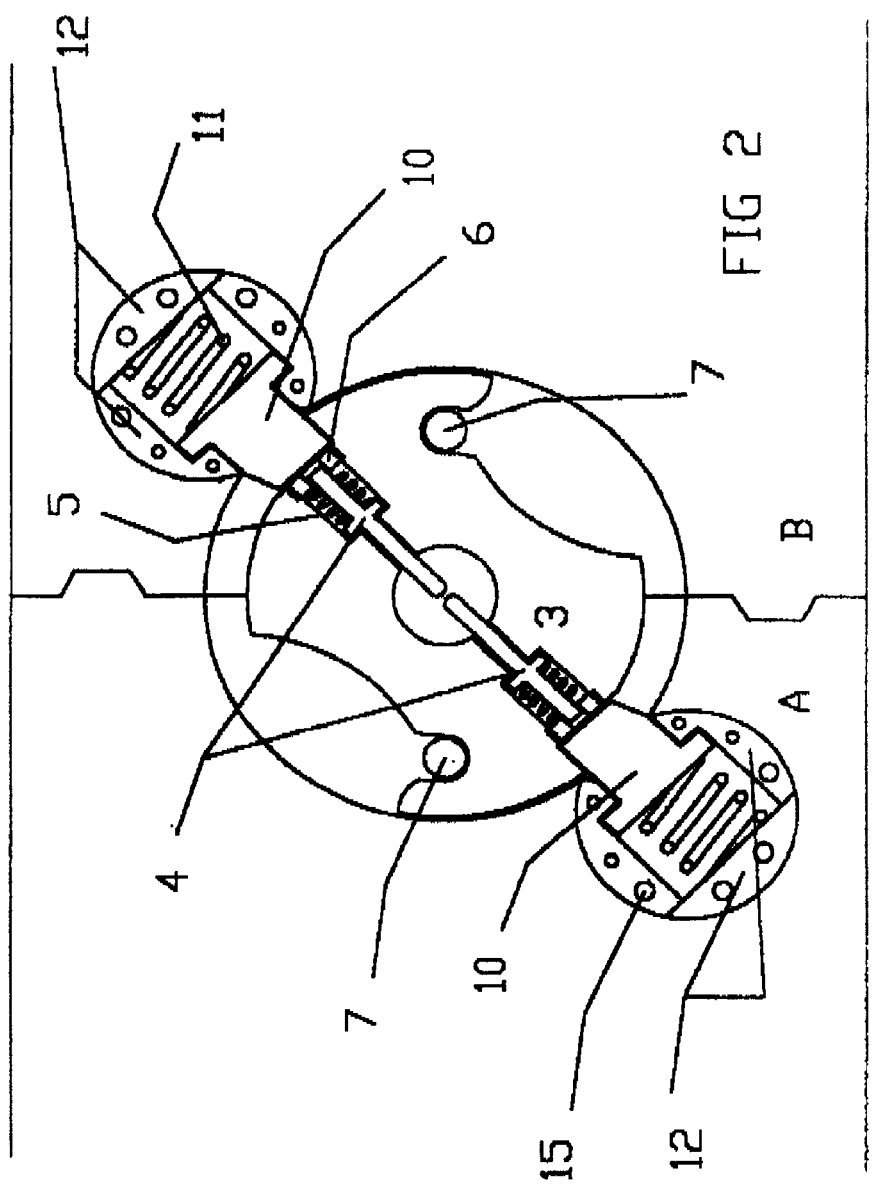
FIG. 2 is a cross sectional view from the side in which the central piece and the spring loaded sliders are in the fully locked position.
Figure 3:
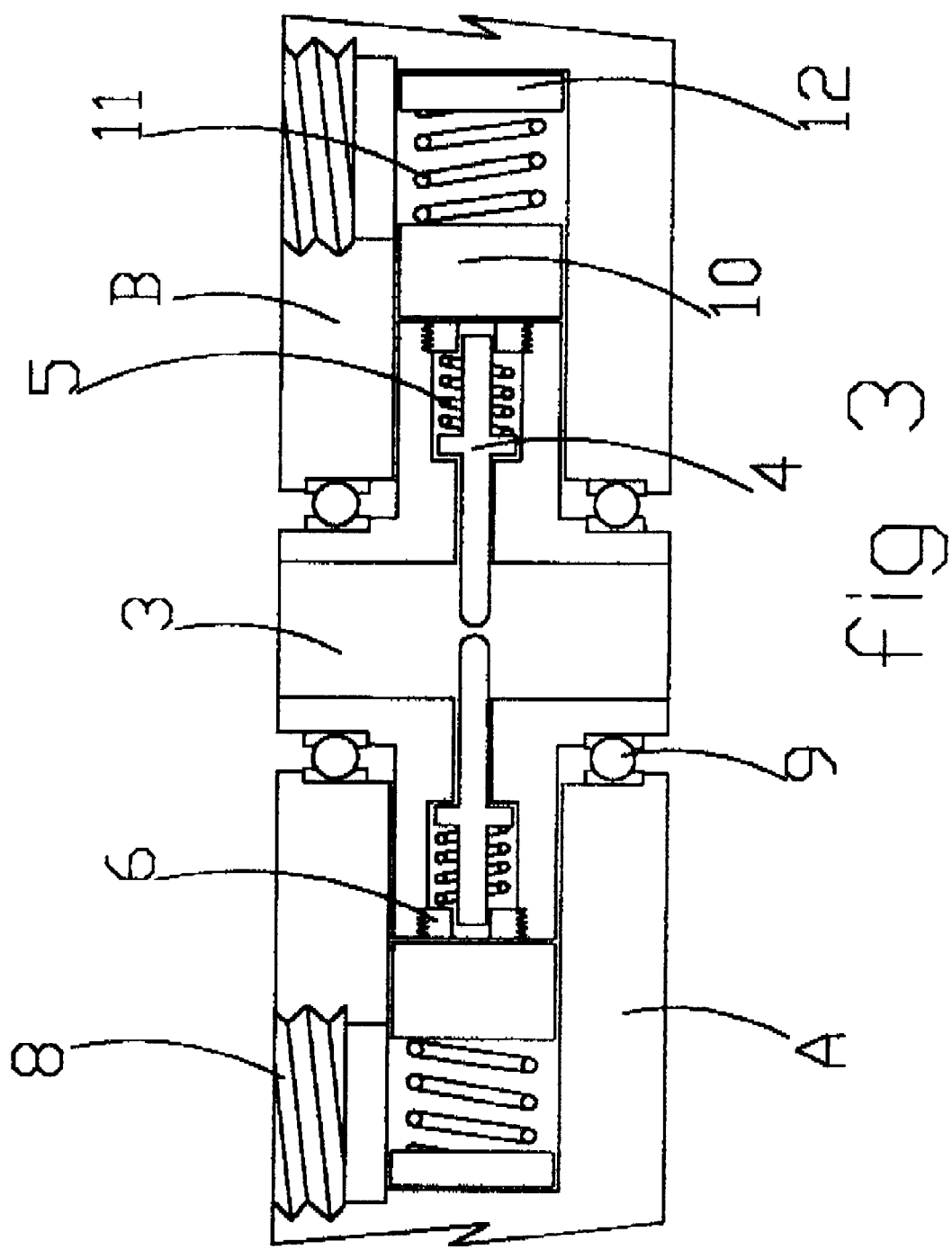
FIG. 3 is a cross sectional view showing the depth of the three pieces assembled at 45 degrees to the axis.
Figure 4:
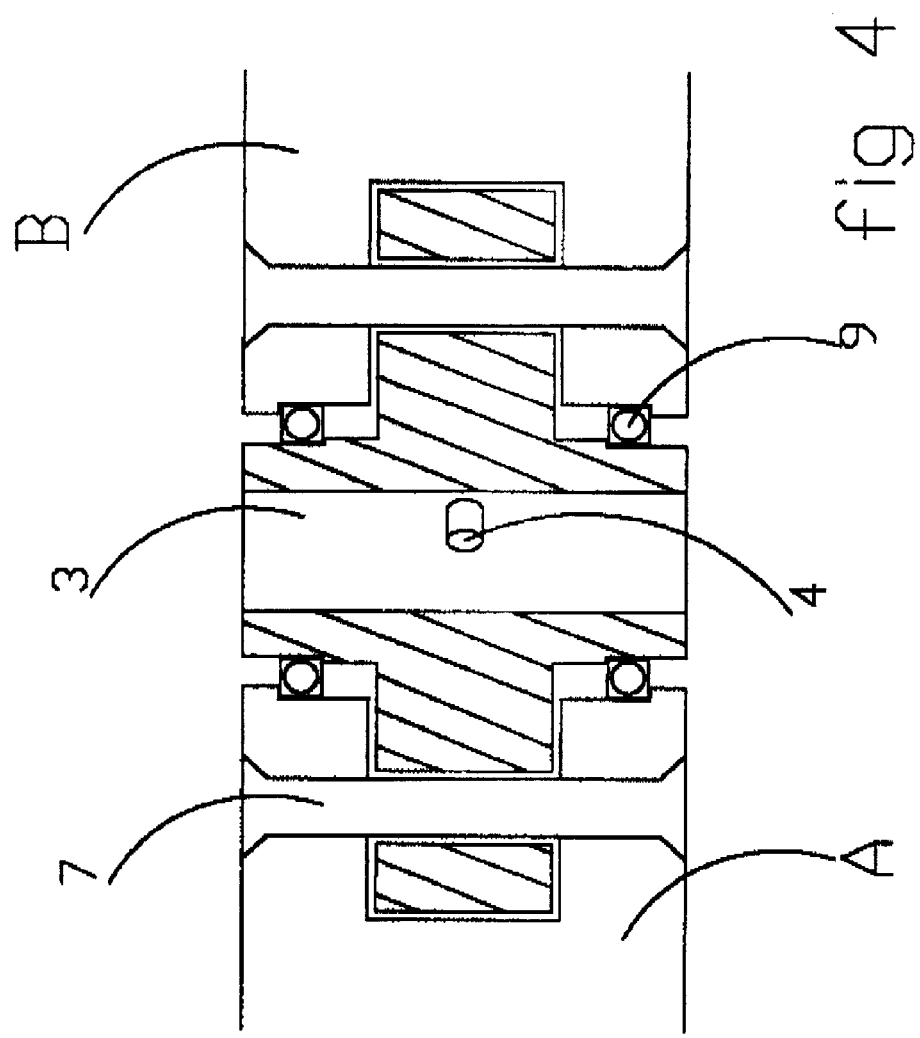
FIG. 4 is a cross sectional view at 90 degrees to the axis.

The central piece (3) shown in FIG. 5 is an independent body that is machined to accommodate two pins (4) that are spring loaded, (calibrated) and two lock nuts that act as keepers, in their rest position, (4, 5, 6). They are set at 180 degrees to each other. These pins have the ability to move to and fro within their respective chambers. The central piece (3) has a hollow center, to allow the wedge (12) to enter and force the pins (4) apart during unlocking only. Two hooks are set at 180 degrees to each other and engage with the rivet (7). The ends of the shaft have two diameters, the inner diameters are greater than the outer, and this acts as a stop for the pressed-in bearings. A cut is machined across the diameter of the shaft ends, and this region is where the screwdriver is engaged and the central piece (3) is rotated, during locking/unlocking stages. Once this independent body, as shown in FIG. 2, is locked it occupies parts of both bodies A and B along the axis. This further assists in the prevention of the twisting motion. At the point where the slider (10) locks into the central piece (3) as shown in FIG.

6 an angle is shown, this angle is not machined to the radius, it is parallel to the centerline of the pins (4).

Figure 7:
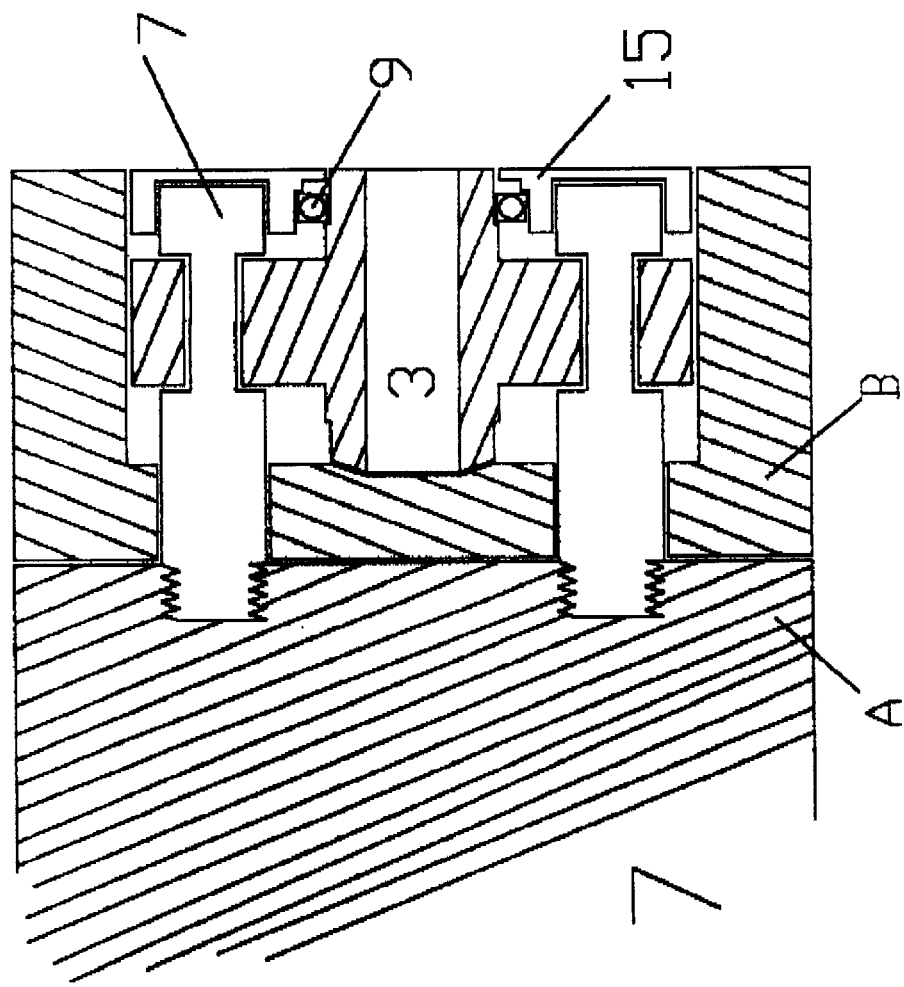
FIG. 7 is a cross sectional view of the "T" junction.

For the construction of the "T" junction 3, 9, and 16 are pressed into each other, and act as one unit. See FIGS. 7, 8, and 9. For this assembly, the two rods that the central piece (3) hooks on to, each has two diameters. The smaller diameter is the one the piece (3) hooks onto. The rods are also threaded on one end, and are tightened into the face of one rail. The second rail has machined regions that enable the two rods to enter from one side, and on the opposite side, there are also regions to accommodate for the central piece, as well as the spring loaded slider assembly.

As shown in FIG. 1 the rails are coupled together. Unlocking the two requires a wedge (14) to be inserted into the center of the shaft. As this is inserted the two pins (4) are forced apart, and outwards, this movement in turn forces the sliders (10) to be pushed back into their respective housings. This action, only then enables the central piece (3) to be able to rotate freely, by the screwdriver. The screwdriver turns clockwise on one side of the rail and anticlockwise on the other side.

I claim:

1. A system for joining two bodies, comprising:
   a first body having a first slot in a surface thereof that is to be joined;
   a first pin extending through said first slot;
   a rotatable disc in and protruding from said first slot, said disc having a pair of diametrically opposed notches, a pair of diametrically opposed first sectors having a first radius, and a pair of diametrically opposed second sectors having a second radius larger than said first radius; and
   a movable first stopper in said first body and that is urged into said first slot to said first radius at a position where said first stopper engages one of said first sectors when said first pin is engaged in one of said notches and one of said second sectors is between said one first sector and said notch that engages said first pin.

2. The system of claim 1, further comprising a release bar inside said one first sector of said disc that is selectively extendable to at least said second radius to push said first stopper out of engagement with said one first sector.

3. The system of claim 1, further comprising a second body having a second slot in a surface thereof that is to be joined to said first body, a second pin extending through said second slot, and a movable second stopper in said second body and that is urged into said second slot to said first radius at a position where said second stopper engages the other one of said first sectors when said second pin is engaged in the other one of said notches and the other one of said second sectors is between said other first sector and said other notch that engages said second pin.

4. The system of claim 3, further comprising, release bar inside said first sectors of said disc that is selectively extendable in diametrically opposed directions to at least said second radius to push said first and second stoppers out of engagement with said respective first sectors.

5. The system of claim 3, wherein said surfaces of said first and second bodies that are to be joined have corresponding male and female elements.

6. The system of claim 1, wherein said notch opens tangentially.

7. The system of claim 1, wherein said first body is a rail.

8. The system of claim 1, wherein each of said first sectors and each of said second sectors is about 45° wide.

9. A system for joining two bodies, comprising:
   a first body having a first slot in a surface thereof that is to be joined;
   a first pin extending through said first slot;
   a rotatable disc in and protruding from said first slot, said disc having in each half thereof a first sector with a first radius, a second sector with a second radius larger than said first radius, a step between said first and second sectors that extends from said first radius to said second radius, and a notch that extends tangentially into said second sector inside said second radius; and
   a movable first stopper in said first body that is urged into said first slot and into engagement with said step of a first half of said disc when said first pin engages said notch of said first half.

10. The system of claim 9, further comprising a release bar inside said first sector of said first half of said disc that is selectively extendable to at least said second radius to push said first stopper out of engagement with said step.

11. The system of claim 9, further comprising a second body having a second slot in a surface thereof that is to be joined to said first body, a second pin extending through said second slot, and a movable second stopper in said second body and that is urged into engagement with said step of a second half of said disc when said second pin engages said notch of said second half.

12. The system of claim 9, wherein said first and second sectors are each about 45° wide.

\* \* \* \* \*